United States Patent [19]
Kervagoret

[11] Patent Number: 5,167,443
[45] Date of Patent: Dec. 1, 1992

[54] ANTI-SKID SYSTEM FOR A MOTOR VEHICLE

[75] Inventor: Gilbert Kervagoret, Argenteuil, France

[73] Assignee: Bendix Europe Services Techniques, Drancy, France

[21] Appl. No.: 802,999

[22] Filed: Dec. 5, 1991

[30] Foreign Application Priority Data

Dec. 20, 1990 [FR] France .................. 90 16024

[51] Int. Cl.⁵ ............................................ B60T 13/20
[52] U.S. Cl. ............................... 303/116.1; 303/84.2; 303/11; 251/61.2
[58] Field of Search ......... 303/116 R, 116 SP, 113 R, 303/113 TR, 115 PP, 84.1, 84.2, 10, 11, DIG. 1, DIG. 2, 117; 137/903; 251/61.2, 61.3, 63.4

[56] References Cited

U.S. PATENT DOCUMENTS

| 3,741,247 | 6/1973 | Kaemmer | 251/61.2 |
|---|---|---|---|
| 4,793,663 | 12/1988 | Ocvirk et al. | 303/116 R |
| 4,838,620 | 6/1989 | Sypniewski | 303/116 |
| 4,883,328 | 11/1989 | Burgdorf et al. | 303/116 R |
| 5,028,096 | 7/1991 | de la Broise | 303/119 |

FOREIGN PATENT DOCUMENTS

| 376788 | 7/1990 | European Pat. Off. . |
|---|---|---|
| 2644417 | 9/1990 | France . |
| 0218153 | 1/1990 | Japan . |
| 8809278 | 12/1987 | PCT Int'l Appl. . |
| 2218480 | 11/1989 | United Kingdom . |

Primary Examiner—Matthew C. Graham
Attorney, Agent, or Firm—Larry J. Palguta; Ken C. Decker

[57] ABSTRACT

The brake system comprises two hydraulic sub-circuits, each connecting a driving wheel and a free wheel to a working chamber of a master cylinder (1) connected to a general reservoir (20) of fluid under low pressure, and including a wheel anti-lock braking device comprising a three-way solenoid valve (51, 52, 53, 54) normally opening communication between an inlet of fluid under pressure and the brake motor, while, in the expansion phase of the anti-lock device, it closes this communication and connects the brake motor to a reservoir (21, 22) of fluid under low pressure to each sub-circuit. The device comprises a differential valve slide consisting of a valve of which one face receives the pressure prevailing in the associated brake motor (31, 32, 33, 34) and the other that as generated by a pump (45, 46) and, at rest, putting in communication the working chamber of the master cylinder (1) and the inlet of fluid under pressure. The valve slide isolates the brake motor from the working chamber of the master cylinder during the operation of the pump (45, 46). A differential pressure/underpressure valve (76, 77) associated with each free wheel closes, at rest, communication between the working chamber of the master cylinder and the suction inlet of the pump (45, 46), and opens this communication in the event of underpressure in the corresponding brake motor (31, 33) only when there is no pressure generated by the master cylinder (1).

4 Claims, 2 Drawing Sheets

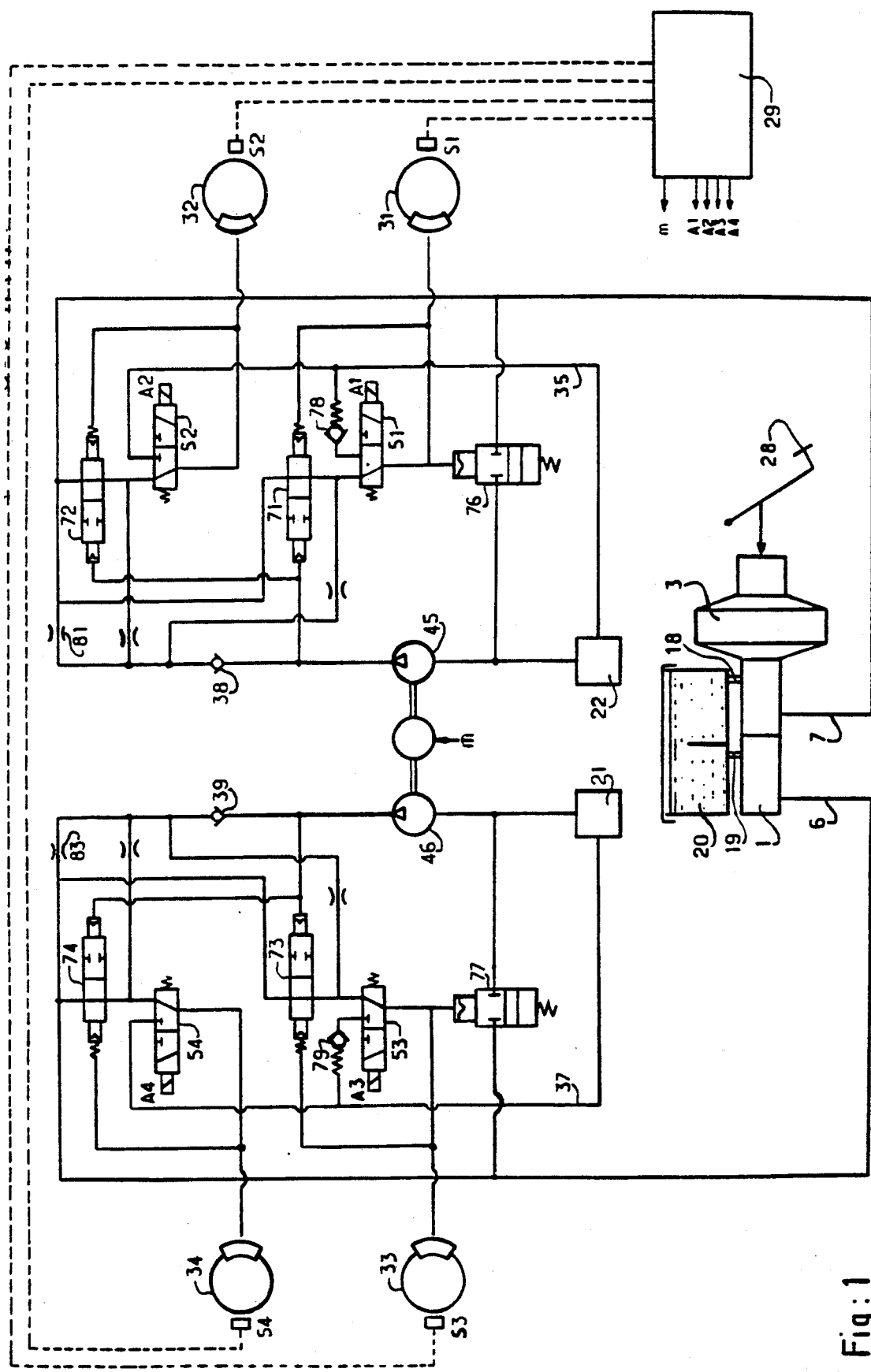
Fig:1

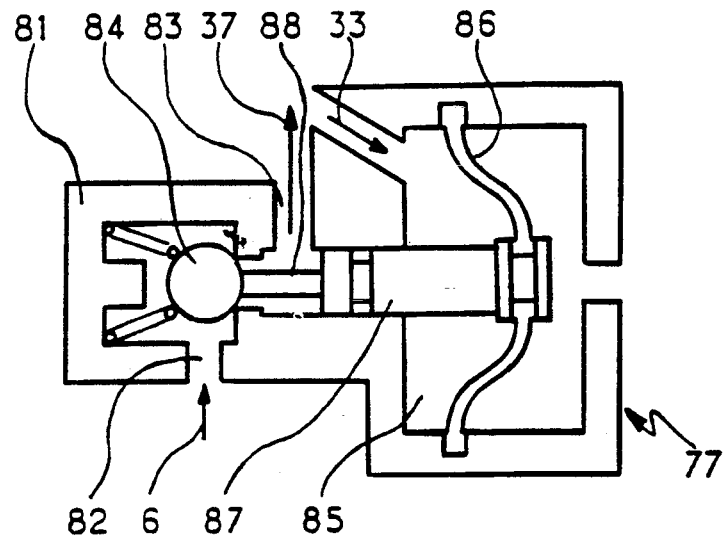
Fig: 2
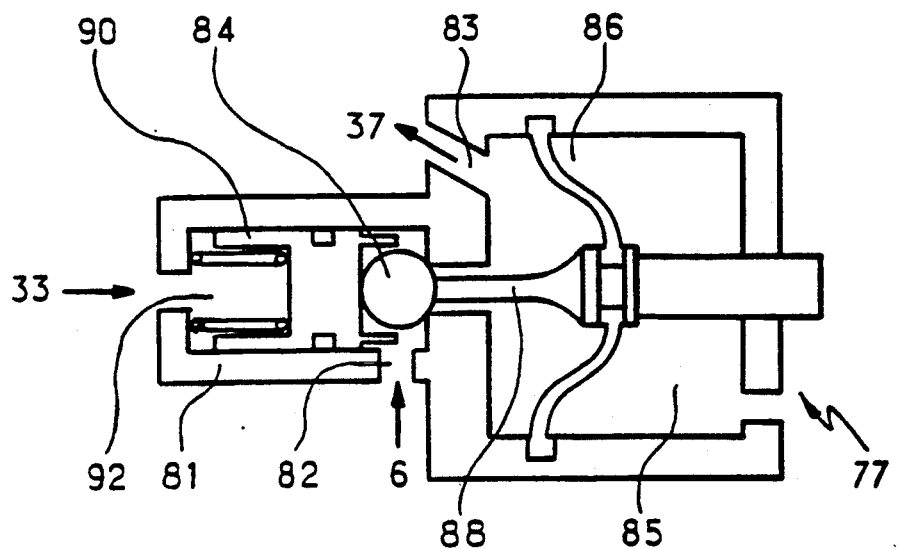
Fig: 3

ANTI-SKID SYSTEM FOR A MOTOR VEHICLE

BACKGROUND OF THE INVENTION

The present invention relates to an anti-skid system for the driving wheels of a motor vehicle, the brake system of which comprises two hydraulic sub-circuits, each connecting a driving wheel and a free wheel to a working chamber of a master cylinder connected to a general reservoir of fluid under low pressure, and includes a wheel anti-lock braking device.

Such a system is described, for example, in DE-A-3,910,285. However, the system of this document has serious disadvantages. In fact, first of all, it requires comprehensive modification of the associated pneumatic brake booster, since the pressure applied to the brake fluid is generated by the master cylinder which thus simulates a depression of the brake pedal by the driver. Moreover, in the anti-lock system, the brake fluid recovered in the expansion phase is sent directly to the reservoir, thus implying that, in the event of a failure of the associated pump, there is no longer any means of braking the vehicle, except to release the pedal to ensure the resupply of the chambers of the master cylinder and then to redepress this pedal, this being substantially contrary to the normal reflex of even a skilled driver.

SUMMARY OF THE INVENTION

The object of the present invention is to provide a simpler and more reliable anti-skid system, the number of solenoid valves of which is strictly limited and which needs no modification to be made to the components of the brake circuit, the aim of this being, furthermore, to reduce its cost substantially.

The invention therefore applies essentially to a brake circuit including an anti-lock device comprising, for each of the wheels, a three-way solenoid valve normally opening communication between an inlet of fluid under pressure and the brake motor associated with the wheel, while, in the expansion phase of the anti-lock device, it closes this communication and connects the brake motor to a reservoir of fluid under low pressure specific to each sub-circuit, and at least one switching slide isolating at least one brake motor from the working chamber of the master cylinder during the operation of the pump associated with the anti-lock device, the pump sucking the fluid from the corresponding specific reservoir.

According to the invention, the anti-skid system comprises a differential valve for each wheel, consisting of a slide, of which one face receives the pressure prevailing in the associated brake motor and the other that generated by the pump and, at rest, putting in communication the working chamber of the master cylinder and the inlet of fluid under pressure, and a differential pressure/underpressure valve associated with each free wheel and, at rest, closing communication between the working chamber of the master cylinder and the suction inlet of the pump, opening this communication in the event of an underpressure in the corresponding brake motor if and only if there is no pressure generated by the master cylinder.

This differential pressure/underpressure valve makes it possible to do without the solenoid valve generally used for this function.

BRIEF DESCRIPTION OF THE DRAWINGS

The invention will now be described by way of example with reference to the accompanying drawings in which:

FIG. 1 shows diagrammatically a brake system including the invention,

FIGS. 2 and 3 partially show diagrammatically two embodiments of a differential pressure/underpressure valve used in the system of FIG. 1.

DETAILED DESCRIPTION OF THE INVENTION

Referring now to FIG. 1, the brake circuit comprises in a conventional way a pneumatic brake booster 3 actuated by a pedal 28. The brake booster 3 actuates a tandem master cylinder 1, represented diagrammatically, the two chambers of which are fed with fluid under low pressure from a reservoir 20 by means of respective conduits 19 and 18. The respective outlet conduits 6 and 7 of the two chambers of the master cylinder 1 determine the two hydraulic sub-circuits called secondary and primary respectively.

The respective conduits 6 and 7 are connected, at rest, to the respective brake motors 34, 33 and 31, 32 of a driving wheel 34, 32 and of a free wheel 33, 31 by means of respective differential valves 74, 73 and 72, 71 and three-way two-position solenoid valves 54, 53 and 52, 51. When they are energized, the respective solenoid valves 54, 53 and 52, 51 break the above-mentioned connection and put the associated brake motors 34, 33 and 32, 31 in communication with a specific reservoir of reduced capacity, specifically a capacity 21 and 22, by way of respective conduits 37 and 35.

This energization is controlled by a central electrical unit 29 in the event of the detection of a risk of locking by the corresponding sensors S4 to S1 each associated with a wheel.

In the event of such a detection, the central unit 29 ensures the starting of the motor M for driving the pumps 46, 45 via the electrical conductor m. These pumps suck up the expanded fluid from the capacity 21, 22 in order to deliver a fluid under pressure to the relevant brake motors 34, 33, 32, 31 by way of a non-return valve 39, 38 when the associated solenoid valve 54, 53, 52, 51 has returned to the rest position.

The differential valves 74 to 71 are associated with each of the wheels. They consist of a slide, to one of the faces of which is applied the pressure prevailing in the associated brake motor 34 to 31 and to the other face of which is applied the outlet pressure of the pump 46, 45. At rest, they ensure communication between the working chambers of the master cylinder 1 and the inlet of fluid under pressure from the solenoid valves 54 to 51. When the pump 46, 45 is set in operation, the pressure cuts off this communication, thus isolating the brake motor from the working chamber of the master cylinder 1.

A non-return valve 79, 78 is arranged in the expansion circuit obtained from the solenoid valve 53, 51 associated with the free wheel.

A differential pressure/underpressure valve 77, 76 is likewise associated with each free wheel. At rest, this latter valve cuts off communication between the working chamber of the master cylinder and the suction inlet of the pump 46, 45. This valve is controlled by an underpressure prevailing in the brake motor 33, 31 associated with the free wheel, in order to open this communication if and only if there is no pressure in the corresponding working chamber of the master cylinder 1.

Thus, during normal braking, the valves are at rest, as illustrated. The brake fluid circulates from the working chamber to the brake motor by way of a differential valve 74, 73, 72, 71 and a solenoid valve 54, 53, 52, 51.

Should a locking of a wheel be imminent, the relevant solenoid valve is energized and the pump is set in operation. The effect of this is to isolate the brake motors from the master cylinder by means of the differential valves 74, 73, 72, 71. The differential pressure/underpressure valve 77, 76 remains in its state of rest, since a pressure is generated in the master cylinder. The conventional anti-lock cycles can therefore take place normally.

The fluid in the relevant brake motor will expand in the associated capacity, from where it is sucked by the pump in order to be returned to the master cylinder by way of the restriction 83, 81 during the expansion phase and then reapplied by the master cylinder and the pump during the next admission.

In the event of a failure of the pump, the master cylinder remains in communication with the brake motors, only the fluid contained in the relevant capacity becomes useless and the vehicle can still be braked at the expense of a slightly longer travel of the brake pedal 28.

In the anti-skid mode, the solenoid valve 53, 51 associated with a free wheel is energized and the pump motor is started. There is then communication between the brake motor 33, 31 of the free wheel and the conduit 37, 35 leading to the suction inlet of the pump 46, 45 by way of the non-return valve 79, 78. This results in an underpressure in the relevant brake motor 33, 31, without a rise in pressure in the master cylinder. This underpressure brings about the displacement of the differential pressure/underpressure valve 77, 76 which then opens communication between the working chamber of the master cylinder 1 and the suction inlet of the pump 46, 45. The pump can thus suck fluid from the reservoir 20 and deliver it under pressure to the relevant brake motor 34, 32, the solenoid valve 54, 52 not being energized and the differential valve 74, 72 isolating the relevant brake motor from the master cylinder.

FIG. 2 illustrates diagrammatically a differential pressure/underpressure valve which can be used in such a system.

It will be described in conjunction with the so-called secondary sub-circuit. This valve comprises, in a body 81, an orifice 82 connected to the conduit 6 leading to the working chamber of the master cylinder An orifice 83 is connected to the conduit 37 leading to the suction inlet of the pump 46.

A shutter consisting of a ball 84 loaded by a spring prevents any communication at rest between these two orifices 82, 83.

A chamber 85 is separated into two parts sealed relative to one another by means of a flexible diaphragm 86. One of the parts of this chamber is connected to the atmosphere and the other receives the pressure prevailing in the associated brake motor 33.

A piston 87 passing through a bore made in the body 81 opposite the ball 84 on the one hand carries a needle 88 facing the ball 84 and on the other hand is fastened to the diaphragm 86.

Thus, in the event of underpressure in the brake motor 33, the piston 87 moves to the left in FIG. 5 and opens communication between the master cylinder and the suction inlet of the pump 46.

If a pressure is generated in the master cylinder, the ball 84 remains laid against its seat, thereby preventing this communication.

FIG. 3 shows diagrammatically another embodiment of a differential pressure/underpressure valve. In this embodiment, the pressure prevailing in the brake motor 33 of the free wheel is applied to a piston 90 carrying the ball 84 forming a shutter. Thus, if a pressure occurs in the brake motor 33 of the free wheel, communication cannot be made between the suction inlet 37 of the pump and the outlet conduit 6 of the master cylinder.

In contrast, in an anti-skid period, an underpressure is established in the brake motor 33 of the free wheel, since this is then connected to the suction inlet of the pump by means of the corresponding solenoid valve 53. This underpressure is thus likewise established in the chamber 92 formed behind the piston 90. The setting in operation of the pump likewise establishes an underpressure in the part of the chamber 85 not connected to the atmosphere, and the needle 88 connected to the diaphragm 86 opens the shutter 84 effortlessly, thus making the necessary communication between the suction conduit 37 of the pump and the outlet conduit 6 of the master cylinder.

This embodiment makes it possible to avoid subjecting the diaphragm 86 to the pressure prevailing in the brake motor 33 of the free wheel. Moreover, it makes it possible to avoid the use of the non-return valves 79, 78.

This embodiment of brake system makes it possible, in particular, to do without the electrical detection of the driver's intention to brake.

It will have been appreciated that many changes and modifications can be made to the present invention by an average person skilled in the art, without departing from the scope of the accompanying claims.

What we claim is:

1. An anti-skid system for the wheels of a motor vehicle, the brake system comprising two hydraulic sub-circuits each connecting a driving wheel and a free wheel to a working chamber of a master cylinder connected to a reservoir of fluid under low pressure, and a wheel anti-lock braking device comprising, for each of the wheels, a three-way solenoid valve normally opening communication between an inlet of fluid under pressure and brake motor associated with the respective wheel, while, in an expansion phase of the anti-lock braking device, the solenoid valve closes the communication and connects the brake motor to a reservoir of fluid under low pressure specific to each sub-circuit, a differential valve slide for each wheel, the different valve slide having opposite faces and including a slide of which one face receives pressure prevailing in an associated brake motor and the other face receives pressure generated by a pump of the anti-lock device and, at rest, putting in communication the working chamber of the master cylinder and said inlet of fluid under pressure, and the differential valve slide isolating the brake motor from the working chamber of the master cylinder during operation of the pump, in the anti-lock mode said pump drawing fluid from said specific reservoir, and a differential pressure/underpressure valve associated with each free wheel and at rest closing communication between the working chamber of the master cylinder and a suction inlet of the pump, the differential pressure/underpressure valve opening such communication in the event of an underpressure in a corresponding brake motor only when no pressure is generated by the master cylinder.

2. The anti-skin system according to claim 1, wherein said differential pressure/underpressure valve comprises, in a body, an orifice connected to the working chamber of the master cylinder and an orifice connected to the suction inlet of the pump, between which a shutter at rest closes communication, and a chamber separated into two parts by means of a flexible diaphragm, one part connected to atmosphere and the other part to a corresponding brake motor, a piston passing through a bore made opposite said shutter and fastened to said diaphragm and capable of opening the shutter in the event of underpressure in the corresponding brake motor.

3. The anti-skid system according to claim 2, wherein a non-return valve is arranged between the three-way solenoid valve associated with the brake motor of a free wheel and said specific reservoir.

4. The anti-skid system according to claim 1, wherein said differential pressure-underpressure valve comprises, in a body, an orifice connected to the working chamber of the master cylinder and n orifice connected to the suction inlet of the pump, between which a shutter at rest closes communication, and a chamber separated into two parts by means of a flexible diaphragm, one part being connected to atmosphere and the other part to the suction inlet of the pump, a piston carrying said shutter and being loaded by pressure prevailing in the brake motor of said free wheel, a needle connected with said diaphragm and capable of opening the shutter in the event of underpressure in the corresponding brake motor when the pump operates.

* * * * *